(12) United States Patent
Abhishek Raja

(10) Patent No.: US 10,719,453 B1
(45) Date of Patent: Jul. 21, 2020

(54) APPARATUS AND METHOD FOR HANDLING MAINTENANCE OPERATIONS FOR AN ADDRESS TRANSLATION CACHE

(71) Applicant: Arm Limited, Cambridge (GB)

(72) Inventor: Abhishek Raja, Austin, TX (US)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/374,018

(22) Filed: Apr. 3, 2019

(51) Int. Cl.
*G06F 12/00* (2006.01)
*G06F 12/1027* (2016.01)
*G06F 12/02* (2006.01)
*G06F 12/0802* (2016.01)

(52) U.S. Cl.
CPC ...... *G06F 12/1027* (2013.01); *G06F 12/0292* (2013.01); *G06F 12/0802* (2013.01); *G06F 2212/657* (2013.01)

(58) Field of Classification Search
CPC ............. G06F 12/0292; G06F 12/0802; G06F 2212/657; G06F 12/1027
See application file for complete search history.

(56) References Cited

U.S. PATENT DOCUMENTS

2018/0300251 A1* 10/2018 Appu .................. G06F 12/0888

* cited by examiner

*Primary Examiner* — Shawn X Gu
(74) *Attorney, Agent, or Firm* — Nixon & Vanderhye P.C.

(57) ABSTRACT

Each entry of a set associative address translation cache (ATC) stores address translation data (ATD) used by processing circuitry when converting a virtual address into a corresponding physical address. The processing circuitry operates in multiple contexts, and each entry has an associated context identifier identifying the context to which the ATD therein applies. A masking structure comprises at least one mask storage and, for each mask storage, an associated context storage. Each mask storage provides a mask field for each set of the ATC. Control circuitry responds to a maintenance request, specifying a given context and requiring a maintenance operation to be performed in respect of each entry of the ATC that stores ATD applying to the given context, by setting each mask field in a selected mask storage, storing an indication of the given context in the associated context storage, and issuing a response to a request source.

20 Claims, 9 Drawing Sheets

APPARATUS AND METHOD FOR HANDLING MAINTENANCE OPERATIONS FOR AN ADDRESS TRANSLATION CACHE

BACKGROUND

The present technique relates to an apparatus and method for handling maintenance operations for an address translation cache.

It is known to provide data processing systems which incorporate an address translation cache, such as a translation lookaside buffer (TLB), to store address translation data relating to the translation of virtual addresses to physical addresses. The provision of an address translation cache is useful in improving performance by reducing the number of slow page table walks to memory required in order to obtain the required address translation data.

It is also known to provide the address translation cache as a set associative structure. When a new item of address translation data is to be allocated into a set associative address translation cache, a number of bits of an associated virtual address can be used to form an index to identify a particular set within the address translation cache, with the address translation data then being stored within one of the entries of that set.

The address translation cache will typically be associated with a processor that references the address translation cache in order to translate virtual addresses into physical addresses, and that processor may be arranged to operate in multiple different contexts. For example, different contexts may be associated with different processes executed by the processor and/or with different exception levels that the processor is operating at. The address translation cache may hold address translation data for multiple different contexts, and each entry may have an associated context identifier to identify the context to which the address translation data stored therein applies. Maintenance operations may need to performed within the address translation cache, and in some instances a maintenance request may target all entries within the address translation cache that store address translation data for a specified context. Within a set associative address translation cache, it can take a significant amount of time to process such a maintenance request. For example, in the worst case where each set contains at least one entry that does store address translation data for the specified context, the number of cycles taken to process the maintenance operations required to implement the maintenance request may be twice the number of sets in the address translation cache (where for each set there is a requirement to perform a read in one cycle, and then a write in a subsequent cycle in order to implement the maintenance operation (for example by invalidating the relevant entry)).

Often, a request source that issues such a maintenance request will implement a barrier operation such that it will only continue its operation once it receives a response identifying that the required maintenance operations have been performed, and accordingly the time taken to process a maintenance request that targets an entire context can have a significant performance impact on the processing performed by the request source. Accordingly, it would be desirable to provide an improved mechanism for handling such maintenance operations for an address translation cache.

SUMMARY

In one example arrangement, there is provided an apparatus comprising: a set associative address translation cache having a plurality of entries organised as a plurality of sets of entries, each entry arranged to store address translation data used by processing circuitry when converting a virtual address into a corresponding physical address of a memory system, the processing circuitry being arranged to operate in a plurality of contexts and each entry having an associated context identifier to identify the context to which the address translation data stored therein applies; control circuitry to control access to the address translation cache; and a masking structure comprising at least one mask storage and, for each mask storage, an associated context storage, each mask storage providing a mask field for each set of the address translation cache; wherein: the control circuitry is arranged to receive a maintenance request issued by a request source and specifying a given context, where the maintenance request requires a maintenance operation to be performed in respect of each entry of the address translation cache that stores address translation data applying to the given context; the control circuitry is responsive to the maintenance request to set each mask field in a selected mask storage, to store an indication of the given context in the associated context storage for the selected mask storage, and to issue a response to the request source that enables the request source to continue operating as though each maintenance operation required by the maintenance request has been performed; and the control circuitry is arranged to use the masking structure to prevent access by the processing circuitry to address translation data that applies to the given context and that is stored in an entry for which the maintenance operation has yet to be performed.

In another example arrangement, there is provided a method of handling maintenance operations, comprising: providing a set associative address translation cache having a plurality of entries organised as a plurality of sets of entries, each entry storing address translation data used by processing circuitry when converting a virtual address into a corresponding physical address of a memory system, the processing circuitry being arranged to operate in a plurality of contexts and each entry having an associated context identifier to identify the context to which the address translation data stored therein applies; providing a masking structure comprising at least one mask storage and, for each mask storage, an associated context storage, each mask storage providing a mask field for each set of the address translation cache; receiving a maintenance request issued by a request source and specifying a given context, where the maintenance request requires a maintenance operation to be performed in respect of each entry of the address translation cache that stores address translation data applying to the given context; responsive to the maintenance request, setting each mask field in a selected mask storage, storing an indication of the given context in the associated context storage for the selected mask storage, and issuing a response to the request source that enables the request source to continue operating as though each maintenance operation required by the maintenance request has been performed; and employing the masking structure to prevent access by the processing circuitry to address translation data that applies to the given context and that is stored in an entry for which the maintenance operation has yet to be performed.

In a still further example arrangement, there is provided an apparatus comprising: set associative address translation cache means having a plurality of entries organised as a plurality of sets of entries, each entry for storing address translation data used by processing circuitry when converting a virtual address into a corresponding physical address of a memory system, the processing circuitry being arranged to operate in a plurality of contexts and each entry having an associated context identifier for identifying the context to which the address translation data stored therein applies; control means for controlling access to the address translation cache means; and masking means comprising at least one mask storage means and, for each mask storage means, an associated context storage means, each mask storage means for providing a mask field for each set of the address translation cache means; wherein: the control means for receiving a maintenance request issued by a request source and specifying a given context, where the maintenance request requires a maintenance operation to be performed in respect of each entry of the address translation cache means that stores address translation data applying to the given context; the control means, in response to the maintenance request, for setting each mask field in a selected mask storage means, for storing an indication of the given context in the associated context storage means for the selected mask storage means, and for issuing a response to the request source that enables the request source to continue operating as though each maintenance operation required by the maintenance request has been performed; and the control means for using the masking means to prevent access by the processing circuitry to address translation data that applies to the given context and that is stored in an entry for which the maintenance operation has yet to be performed.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
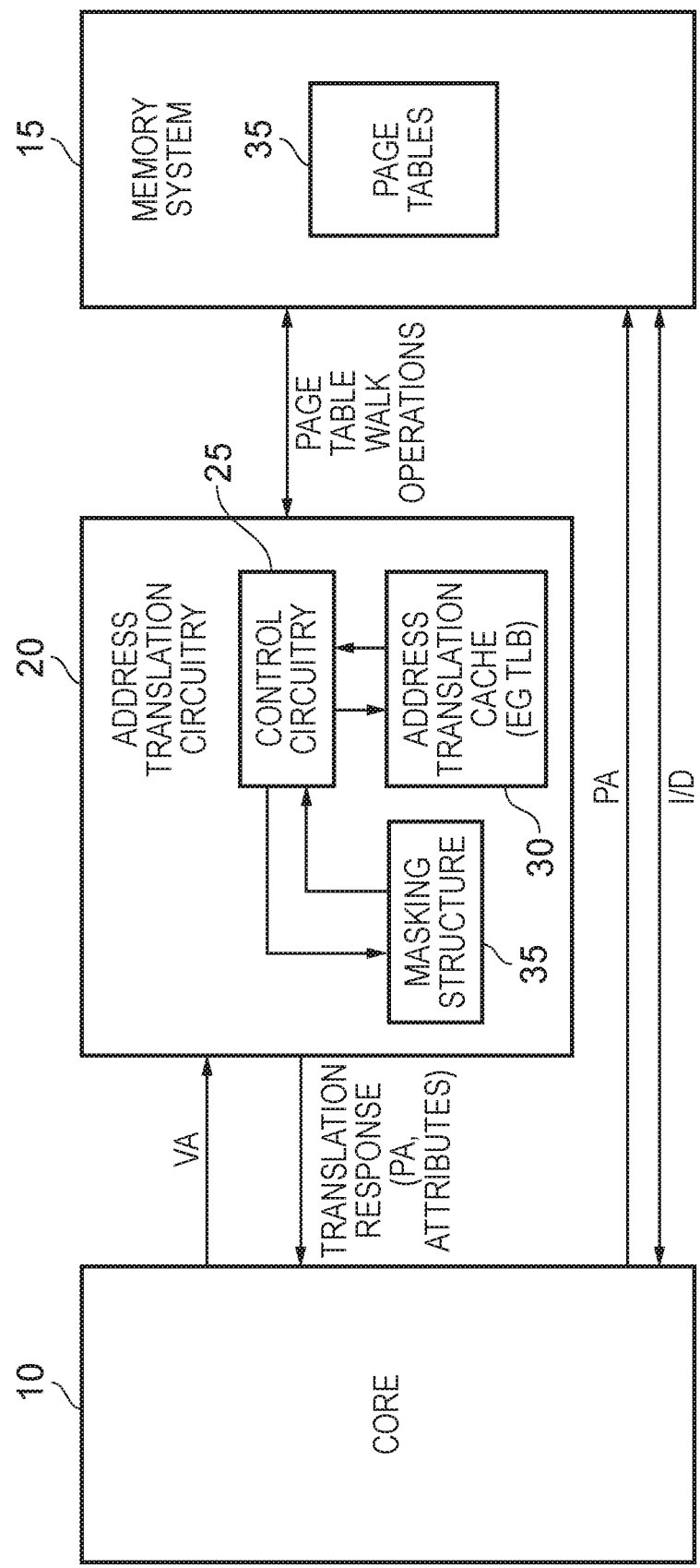
FIG. 1 illustrates a data processing system incorporating an address translation cache in accordance with one example configuration.

In one example arrangement, an apparatus is provided that incorporates a set associative address translation cache having a plurality of entries organised as a plurality of sets of entries. Each entry is arranged to store address translation data used by processing circuitry when converting a virtual address into a corresponding physical address of a memory system. The processing circuitry is arranged to operate in a plurality of contexts, and each entry has an associated context identifier to identify the context to which the address translation data stored therein applies. Whilst the associated context identifier can be provided in a variety of ways, in one implementation each entry incorporates a field within which the associated context identifier is provided.

Control circuitry is used to control access to the address translation cache. Such accesses may be performed for a variety of reasons, for example to perform a lookup within the address translation cache based on a virtual address provided by the processing circuitry, in order to determine whether the address translation data required to translate that virtual address into a corresponding physical address is present within the address translation cache, or to perform various maintenance operations indicated by maintenance requests received by the control circuitry.

In accordance with the techniques described herein the apparatus also provides a masking structure that comprises at least one mask storage and, for each mask storage, an associated context storage. Each mask storage provides a mask field for each set of the address translation cache. As will be described in more detail herein, the masking structure is used to improve the performance in the handling of certain maintenance requests, and in particular to avoid the request source that issues the maintenance request from being adversely affected by the time taken to perform the required maintenance operations within the address translation cache, thereby improving system performance.

In particular, the control circuitry can be arranged to receive a maintenance request issued by a request source and specifying a given context. It should be noted that the given context may or may not be the context in which the processing circuitry is currently operating. The maintenance request of interest to the present technique is a maintenance request that requires a maintenance operation to be performed in respect of each entry of the address translation cache that stores address translation data applying to the given context. Hence, to implement such a maintenance request, it is necessary to access each of the sets of the set associative address translation cache in order to check whether any of the entries in each set stores relevant address translation data, and in that event to perform the required maintenance operation in respect of such an entry. As mentioned earlier, this can have a significant performance impact on the request source, since it is often the case that the request source will await confirmation that the maintenance request has been actioned, before continuing its operation.

However, in accordance with the techniques described herein the control circuitry is responsive to such a maintenance request to set each mask field in a selected mask storage, to store an indication of the given context in the associated context storage for the selected mask storage, and to issue a response to the request source that enables the request source to continue operating as though each maintenance operation required by the maintenance request has been performed. At this point, it should be noted that the required maintenance operations have not actually been performed, but the control circuitry is arranged to use the masking structure to prevent access by the processing circuitry to address translation data that applies to the given context and that is stored in an entry for which the maintenance operation has yet to be performed.

Hence, by such an approach, it is possible to decouple the performance of the required maintenance operations from the response returned to the request source, whilst reliably ensuring that the processing circuitry does not obtain access to out-of-date address translation data within the address translation cache due to any of the maintenance operations not yet having been performed. Once the selected mask storage has had its mask fields set in the manner discussed above, and the given context has been associated with that selected mask storage, then the required maintenance operations can be performed in due course, on a set-by-set basis, with the relevant mask fields being cleared as the maintenance operations are performed within the associated sets. This enables a track to be maintained of which sets have been subjected to the maintenance operation, and which have not, whilst continuing to prevent access by the processing circuitry to out-of-date address translation data within any set that has not yet been subjected to the maintenance operation.

In one example implementation, the control circuitry is responsive to a translation request identifying a virtual address and an associated context, to perform, as a default operation, a lookup operation in the address translation cache to determine whether the address translation data required to convert the identified virtual address into the corresponding physical address is stored in one of the entries of a determined set of the address translation cache. The determined set is dependent on the identified virtual address, and in particular a certain number of bits of the identified virtual address are used to produce an index that is used to identify one of the sets of the address translation cache. Only the content of the entries within that determined set are then subjected to the lookup operation. If the required address translation data for the context associated with the specified virtual address is present within one of those entries, then it can be used directly to provide the address translation data required to convert the virtual address into a physical address. Otherwise, a page table walk process can be invoked in order to obtain the required address translation data from page tables in memory, with that address translation data then being returned to the processing circuitry. At that time, an entry may also be allocated within the determined set in order to cache that address translation data, so that it will be available in due course should a subsequent request be issued relating to the same page in memory.

However, whilst the above is the default operation that is performed upon receipt of a translation request, the control circuitry can be arranged, when the associated context is the given context and the mask field for the determined set is set in the selected mask storage, to perform an alternative operation instead of the default operation. As part of the performance of the alternative operation, the control circuitry will cause the maintenance operation to be performed in respect of any entry of the determined set that stores address translation data applying to the given context.

In addition, in one example implementation, performance of the alternative operation further causes a response to be output for the translation request that provides the address translation data that applies after the maintenance operation has been performed. In one example implementation, since the determined set has been flagged by the selected mask storage as being a set that is yet to be subjected to the maintenance operation, that address translation data is not obtained directly from the address translation cache, but instead is obtained via a page table walk process, with the fact that the mask field for the determined set is set in the selected mask storage being used to effectively trigger a miss within the address translation cache without needing to perform a lookup within the determined set, to thereby invoke the page table walk process.

In one example implementation, once the maintenance operation has been performed in respect of each entry of the determined set that stores address translation data applying to the given context, the masking structure is arranged to clear within the selected mask storage the mask field for the determined set. Hence, at this point, the selected mask storage will identify that the maintenance operation has now been performed in respect of the determined set, and accordingly any subsequent translation request that identifies a virtual address and the given context, and which maps to the determined set, can be subjected to the normal, default, lookup operation within the determined set in order to identify whether the required address translation data is stored therein or not.

In one example implementation, during performance of the alternative operation the control circuitry is arranged to initiate a page table walk process in order to obtain from the memory system the address translation data required, for the given context, to convert the identified virtual address into the corresponding physical address, and to allocate that obtained address translation data into a chosen entry of the determined set whilst ensuring that the maintenance operation is performed in respect of any entry of the determined set that already stores address translation data applying to the given context. Hence, the updated address translation data as obtained by the page table walk process is allocated into an entry of the determined set, and also during the alternative operation the maintenance operation is performed in respect of any entry of the determined set that was already storing address translation data applying to the given context.

The chosen entry into which the address translation data obtained by the page table walk process is allocated may vary, depending on the contents already stored within the determined set. For example, in one implementation, when at least one entry in the determined set already stores address translation data applying to the given context, the chosen entry is selected from said at least one entry.

If there is only one entry in the determined set that already stores address translation data applying to the given context, then the chosen entry will in one example implementation be that entry. However, when multiple entries in the determined set already store address translation data applying to the given context, then the chosen entry will be one of those entries (which can in one implementation be chosen at random), and all of the other multiple entries other than the chosen entry are then invalidated in order to implement the maintenance operation.

It will also be appreciated that, since each mask field in the selected mask storage was set upon receipt of the maintenance request, without any knowledge as to whether the associated set did or did not store any address translation data for the given context, then it is also possible that no entry in the determined set will be found to already store address translation data applying to the given context. In that event, the control circuitry may be arranged to implement a default selection policy in order to identify the chosen entry into which the obtained address translation data is to be allocated, and no entries need to be invalidated in order to implement the maintenance operation.

In accordance with the above described technique, the required maintenance operations are performed on a set-byset basis, as and when translation requests are issued that cause those sets to be identified. However, in addition, or alternatively, a different mechanism can be used to perform the required maintenance operations. For example, in one implementation the control circuitry is arranged to perform the maintenance operations required by the maintenance request as a background activity, and once the maintenance operation has been performed in respect of each entry of a chosen set that stores address translation data applying to the given context, the masking structure is arranged to clear within the selected mask storage the mask field for the chosen set. Hence, in such an implementation the control circuitry can use any free cycles, i.e. where no translation requests or other maintenance requests are being performed, to process the outstanding maintenance request using the contents of the masking structure to identify the sets that have not yet had the required maintenance operation performed on them. Again, as each set is subjected to the required maintenance operation, the masking structure is arranged to clear within the selected mask storage the mask field for the chosen set, so that an accurate record can be kept of which sets are still to be subjected to the maintenance operation.

In one example arrangement, once all mask fields within the selected mask storage have been cleared, the masking structure is arranged to de-allocate the selected mask storage, to enable that mask storage to be available for selection in association with a subsequent maintenance request. Hence, the resources of the masking structure can be freed up as soon as the required maintenance operations have been performed, so as to make those resources available for a subsequent maintenance request.

In one example implementation, the control circuitry is responsive to the maintenance request, at least in the absence of a special condition, to choose an unallocated mask storage to be allocated as the selected mask storage for the given context. In some implementations, there may in fact be only a single mask storage, and associated context storage, but in other implementations more than one mask storage may be provided, each having an associated context storage. However, irrespective of whether there are multiple mask storages or only a single mask storage, it is possible that at the time a maintenance request is received that targets an entire context, there may be no unallocated mask storage available. In that event, there are a number of steps that could be taken.

For example, it could be decided to merely stall the maintenance request, awaiting one of the mask storages to become available. However, in some implementations such an approach may be considered inappropriate, since it may be unclear how long such a maintenance request would need to be stalled. As an alternative approach, it could be decided to implement the maintenance request using a standard mechanism. As discussed earlier, such a maintenance request may then take a significant number of cycles to complete, and hence the earlier-mentioned performance benefit may not be realised in respect of that particular maintenance request, but will still be realised in respect of any maintenance requests for which the control circuitry can make use of the masking structure.

In one example implementation, a special condition may be detected when a mask storage is already allocated for the given context. For example, a second maintenance request relating to a particular context may be received whilst an earlier maintenance request for the same context is still in the process of being actioned by the control circuitry with reference to the contents of the mask storage. In that event, the control circuitry may be arranged to be responsive to the later maintenance request to choose the already allocated mask storage as the selected mask storage, and to set any mask field in that selected mask storage that is currently cleared. In particular, when the maintenance operation required by each maintenance request is the same, for example requiring entries storing out-of-date address translation data to be invalidated, then upon receipt of the later maintenance request it is merely sufficient to change all of the mask fields of the selected mask storage to be the set state, so that all of the sets are again in due course checked and any required maintenance operation performed.

The maintenance operation can take a variety of forms, but in one example implementation the maintenance operation to be performed in respect of each entry of the address translation cache that stores address translation data applying to the given context is an invalidate operation, such that address translation data stored in the address translation cache for the given context at the time the maintenance request is processed by the control circuitry is to be invalidated.

The contexts in which the processing circuitry may operate can take a variety of forms. For example, the processing circuitry may be arranged to execute multiple processes, and a current context may be dependent on at least which process is currently being executed.

As another example, the processing circuitry may be configured to operate at multiple different levels of software execution privilege, referred to herein as different exception levels. When an exception causing event causes an exception to be taken, this will typically require the execution of an interrupt service routine (also referred to as an exception handling routine) in order to deal with the exception. Often, although not in all cases, it may be required for the processing circuitry to transition to a different, higher privilege, exception level, prior to executing the interrupt service routine in order to handle the exception. In implementations where the processing circuitry can operate at different exception levels, the current context may be dependent on which exception level the processing circuitry is operating at.

In one particular example arrangement, the processing circuitry is arranged to execute multiple items of supervised software under the control of a supervising element, each item of supervised software having associated applications, and a current context of the processing circuitry is dependent on the item of supervised software and the associated application currently being executed. As a particular example, each item of supervised software may comprise a guest operating system, and the supervising element may be a hypervisor used to manage execution of the guest operating systems. As will be well understood, the hypervisor can be constructed in a variety of ways, for example as software or firmware. When operating the apparatus in such a way, each guest operating system, along with the applications running thereunder, may be referred to as a virtual machine, with the hypervisor controlling the execution of multiple virtual machines on the apparatus.

Each mask storage within the masking structure can take a variety of forms, but in one example implementation each mask storage is arranged to store a bit vector, and each mask field in that instance comprises a bit in the bit vector. Hence, the set or clear status of each mask field can be identified by the bit value of that mask field, for example with a logic one value indicating a set state and a logic zero value indicating a clear state.

Particular examples will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes an address translation cache 30, which in one example may take the form of a translation lookaside buffer (TLB). The address translation cache 30 has a plurality of entries, where each entry stores address translation data used when converting a virtual address into a corresponding physical address of the memory system. The address translation data is determined by performing page table walk operations in respect of page tables 35 stored within the memory system 15. Through use of the page table walk operations, address translation data may be determined enabling a virtual address to be converted into a physical address, and that address translation data may be stored within the address translation cache 30.

As shown schematically in FIG. 1, when the core 10 issues a virtual address to the address translation circuitry 20, the control circuitry 25 can perform a lookup operation within the address translation cache 30 to determine whether a hit is detected within one of the entries of the address translation cache. In one example configuration, the address translation cache has a set associative structure, and certain bits of the virtual address may be used as an index into the address translation cache in order to identify a set, with the entries within that set being reviewed in order to determine whether a hit is detected. If a hit is detected, then a translation response can be returned directly to the processor core 10, this including physical address bits and associated attributes stored within the hit entry within the address translation cache. Based on this information, the core can then generate a physical address to output to the memory system 15 in order to access a required instruction, or data to be manipulated. If a hit is not detected within the address translation cache, the address translation circuitry 20 will initiate a page table walk process in order to access the relevant page tables 35 within the memory system in order to walk through a sequence of descriptors until a final level descriptor is obtained, at which point the address translation data can be determined and an appropriate translation response can then be returned to the core. The obtained address translation data can also be stored within an entry of the address translation cache 30. This is likely to enable a subsequently issued virtual address to result in a hit within the address translation cache, thereby reducing access times.

Figure 2:
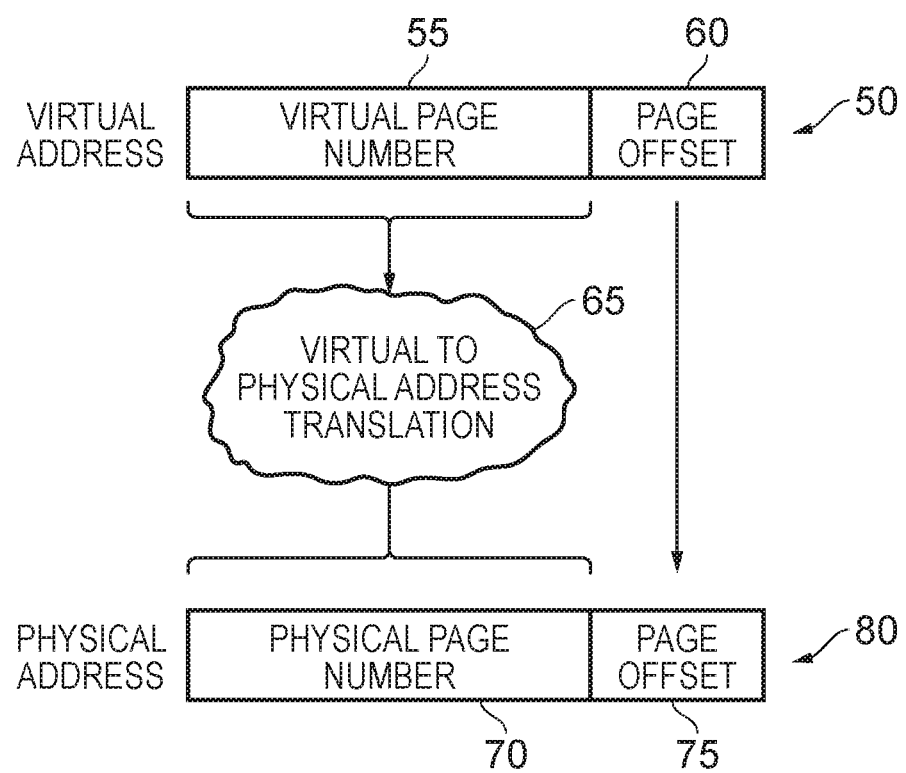
FIG. 2 is a diagram schematically illustrating a virtual address to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bits 60 in the virtual address.

In addition to the processing of translation requests from the processor core 10, the control circuitry 25 within the address translation circuitry 20 may also need to process maintenance requests issued from a request source. The request source may be the processor core 10, or may be another element within the system incorporating the apparatus of FIG. 1. For example, another processor core within the system may issue a maintenance request which requires actions to be taken in respect of a number of address translation caches, including the address translation cache 30 associated with the processor core 10.

In some instances, the maintenance request may specify a particular context, and require the maintenance operation to be performed in respect of each entry of the address translation cache that stores address translation data applying to that specified context. As mentioned earlier, the processor core 10 may operate in a plurality of different contexts, and the contexts may depend for example on the current process being executed by the processor core, the current exception level of the processor core, etc. In one specific example as will be discussed later with reference to FIG. 8A, the processor core 10 may be arranged to employ a hypervisor to manage multiple virtual machines, where each virtual machine may consist of a guest operating system and associated applications. A current context of the processor core may then depend on the guest operating system that is currently executing, and the application being run by that guest operating system. In one particular example the guest operating system may be identified by a virtual machine identifier (VMID), and the application being run may have an associated address space identifier (ASID), and both the VMID and ASID information may be used to identify the current context. In some implementations, this information can be combined with additional information, such as the exception level at which the processor core is operating, in order to fully identify the current context.

The context specified by the earlier-mentioned maintenance request may or may not correspond to the current context of the processor core, but irrespective of whether it does or does not match the current context of the processor core, it requires a maintenance operation to be performed in respect of any entry in the address translation cache 30 that stores address translation data for that context. As mentioned earlier, the address translation cache can be arranged as a set associative structure, and accordingly in order to process such a maintenance request it is necessary to access each set within the address translation cache. In fact, more than one access to each set may be required. For example, a read access may be performed to a set in order to perform a lookup within each of the entries of the set, to identify whether any of those entries store valid address translation data for the context specified by the maintenance request. If they do, then a subsequent write access to that set may also be required in order to perform a write operation in respect of any such entry in order to implement the required maintenance operation. In one particular example, the maintenance operation required is to invalidate the entry, and accordingly the write operation causes the valid bit of the entry to be cleared. Hence, in a worst case scenario, where there is at least one entry in every set that stores valid address translation data for the context specified, it will be appreciated that the number of accesses required may be up to twice the number of sets in the address translation cache.

Further, it is often the case that the request source that issues such a maintenance request will implement a barrier operation thereafter to ensure that it receives a sync response to identify that the maintenance request has been actioned, before it is allowed to continue its operations. Accordingly, in instances where it takes many cycles to perform the maintenance operations required by the maintenance request, this can significantly impact the performance of the request source, and lead to a significant slowdown in system performance. However, as will be discussed in more detail herein, a masking structure 35 is provided for access by the control circuitry 25, which can be used by the control circuitry to control the handling of such maintenance requests, in a way that allows an early sync response to be issued to the request source, whilst ensuring that the processor core 10 is prevented from accessing out-of-date information within the address translation cache 30.

Figure 3:
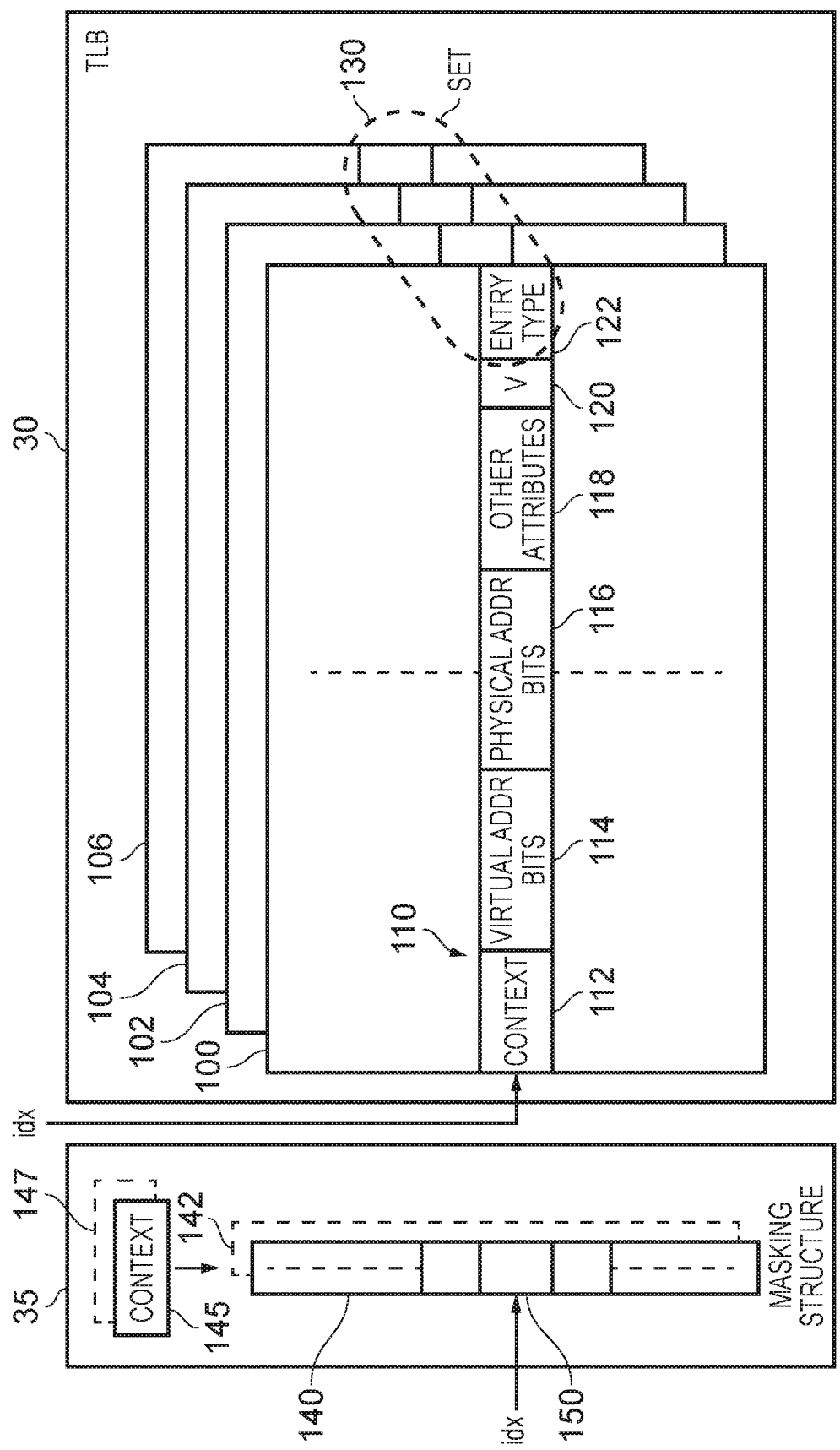
FIG. 3 is a diagram schematically illustrating the provision of a masking structure in association with the address translation cache, in accordance with one example arrangement.

FIG. 3 is a diagram schematically illustrating the set associative storage structure of the address translation cache 30. In this particular example, the address translation cache is a four-way set associative structure consisting of the four ways 100, 102, 104, 106. Each way contains a plurality of entries 110, and one entry from each way is used to form a set 130. When a virtual address is provided from the processor core to the address translation circuitry 20, then a certain number of bits of the virtual address are used to identify an index into the address translation cache which, as schematically illustrated in FIG. 3, is used to identify one of the sets 130. A lookup is then performed in each entry of the set (which as discussed earlier comprises one entry from each of the ways) in order to determine whether the required address translation data is present within one of those entries.

Each entry 110 can be provided with a plurality of fields for storing the information pertaining to that entry. A first field 112 can be used to store a context identifier used to identify the context to which the address translation data stored therein applies. In the specific example discussed earlier, the context will be dependent on the VMID, ASID and exception level information to which the address translation data relates. A virtual address field 114 then contains a certain number of the virtual address bits. The physical address field 116 then provides the corresponding physical address bits. One or more additional fields 118 may be used to capture other attributes relevant to the entry, for example the page size in memory associated with the address translation data, any access permission information, memory type information (such as whether the associated page relates to a writeback region of memory, a non-cacheable region), etc. A further field 120 is used to store a valid bit to identify if the entry stores valid information. In addition, a field 122 may be provided to indicate the type of the address translation data stored within the corresponding entry. For example in one implementation entries can be used to store not only the address translation data required to fully convert a virtual address into a corresponding physical address, but also intermediate translation data that does not enable a full conversion of a virtual address into a physical address, but enables a partial translation to be obtained, thereby reducing the number of page tables that need to be accessed in order to obtain the complete address translation information.

As also shown in FIG. 3, a masking structure 35 can be provided in association with the address translation cache. This may include one or more mask storages 140, 142, each of which has associated therewith a context storage 145, 147 used to identify a context to which the corresponding mask storage relates. In one example, there may be a single mask storage 140 and an associated context storage 145, but if desired multiple mask storages and associated context storages may be provided. For each mask storage and associated context storage, a valid flag may be provided to identify whether the contents are valid. If a mask storage/associated context storage is valid, this means that those resources are currently allocated for the context that is identified in the context storage, whereas if the mask storage/associated context storage is marked as invalid, this means that those resources are currently deallocated and hence available for allocation to a context.

Each mask storage 140, 142 comprises a plurality of mask fields 150, where one mask field 150 is provided for each set of the address translation cache. The manner in which the masking structure 35 is used to enable an early sync response to be sent to a request source that issues a maintenance request requiring a maintenance operation to be performed in respect of each entry of the address translation cache that stores address translation data applying to a specified context, will now be described with reference to FIG. 4.

Figure 4:
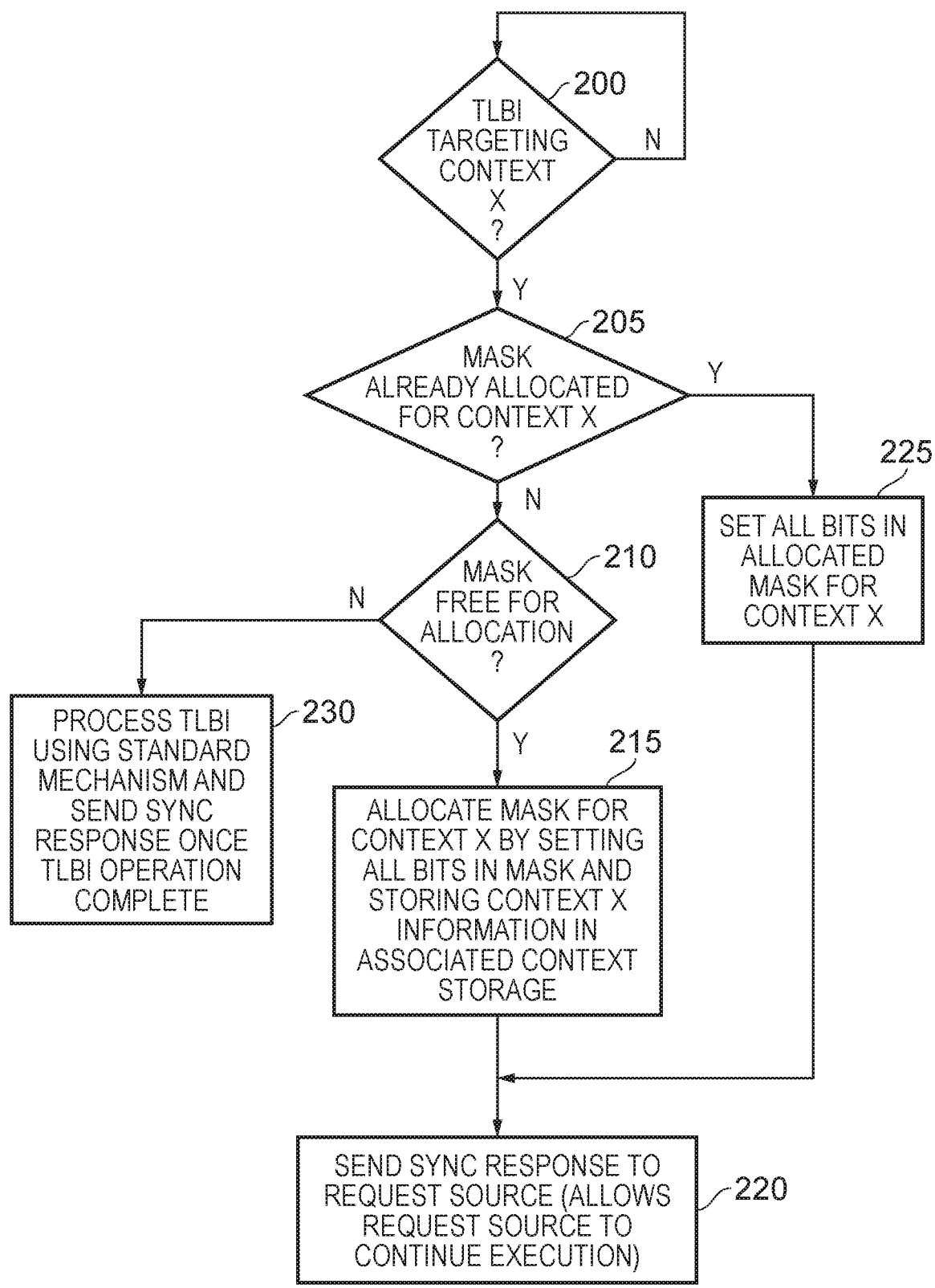
FIG. 4 is a flow diagram illustrating the steps performed by the control circuitry of FIG. 1 upon receipt of a TLB invalidate request targeting an entire context, in accordance with one example implementation.

As shown in FIG. 4, at step 200 the control circuitry determines whether a maintenance request has been received targeting a specific context. Whilst the maintenance request can take a variety of forms, for the purposes of illustration it will be assumed herein that the maintenance request is an invalidate request requiring any entries storing address translation data for the specified context to be invalidated. It will also be assumed that the address translation cache is a TLB, and accordingly the maintenance request will be referred to herein as a TLBI request. For the purposes of describing FIG. 4, it will be assumed that the given context specified by the TLBI request is context X.

When the control circuitry receives such a TLBI request, the process proceeds to step 205, where it is determined whether a mask storage has already been allocated for context X. This can be determined by looking at the contents of the context storage elements 145, 147 that are marked as valid.

Assuming a mask has not already been allocated, then the process proceeds to step 210 where it is determined whether there is a mask that is available for allocation. In particular, at this point it needs to be determined whether there is at least one mask storage 140, 142 that is not actively being used to process a previous maintenance request. Assuming this is the case, the process proceeds to step 215 where a mask storage is allocated for context X by setting all mask fields in the allocated mask storage 140, 142, and then storing in the associated context storage 145, 147 an indication of the context X (that allocated mask storage/associated context storage will also then be marked as valid).

Whilst the mask storage 140, 142 can take a variety of forms, in one example implementation each mask field 150 is a single bit, and hence each mask storage 140, 142 effectively stores a bit vector, where each bit in the vector is associated with one of the sets. In one example implementation, this bit vector may be referred to as a flash invalidate bit vector (FIBV), since it is a bit vector that identifies that an invalidation is required, and effectively represents a flash invalidate, since the response can be issued in one cycle, as will be apparent from the following discussion.

In particular, once step 215 has been performed, then a sync response can be immediately sent at step 220 to the request source. As mentioned earlier, the request source may be implementing a barrier operation to prevent continued operation of the request source until the sync response is received. In accordance with the technique described above, the sync response can be sent after one cycle, since only a single cycle is required to allocate the mask and store the required context information within the associated context storage element.

It will be noted at this point that the actual invalidation operations required to implement the TLBI request have not been performed, but as will be apparent from subsequent discussions the masking structure 35 can be used to ensure that the processor core does not gain access to any out-of-date address translation information cached within the address translation cache pertaining to context X, and at the same time can be used to cause the invalidation operations to be performed on a set-by-set basis. Accordingly, the actual invalidation operations can be performed on a more leisurely basis without compromising accuracy in the address translation information made available to the processor core, and without delaying sending of the sync response to the request source.

If at step 205 it is determined that a mask storage is already allocated to context X, then the process proceeds directly to step 225, where all of the bits in the allocated mask storage 140, 142 are then set for context X. In particular, if at step 205 it is determined that a mask storage is already allocated for context X, this means that a previous maintenance request has been issued relating to context X, and is in the process of being handled by the control circuitry with reference to the contents of the masking structure. It may be that one or more of the bits in the mask storage 140, 142 have been cleared, since the invalidation operation may have been performed in respect of the associated sets, but now that a new TLBI request has been issued to context X, this effectively supersedes the previous request, and can be actioned merely by setting all the bits in the already allocated mask storage for context X at step 225. Thereafter, the process can proceed directly to step 220, where the sync response can be sent to the request source.

If at step 210 it is determined that a mask is not free for allocation, then this means that all the masking structure resources 35 are currently being used. There are a number of steps that can be taken at this point. For example, in some implementations it may be considered sufficient to merely wait for one of the mask storage elements 140, 142 to be deallocated, so that it can then be used to handle the current TLBI request. However, in some implementations this may be considered inappropriate, since it will typically be unclear how long the delay will be until one of the mask storage elements 140, 142 becomes available. Hence, as shown in FIG. 4, in an alternative implementation, if there is not a mask available for allocation at step 210, the process proceeds to step 230 where the TLBI request is processed using a standard mechanism, such as that discussed earlier. In such a situation, the sync response will only be sent once the TLBI operation is complete, i.e. once all of the required accesses have been performed to the TLB 30 in order to invalidate any relevant entries in any of the sets. Hence, when step 230 is performed, there may be a significant delay before the sync response can be issued, and hence the performance benefits associated with the masking structure 35 cannot be achieved for the particular TLBI request currently being processed. Nevertheless, the performance benefits can still be realised for any other TLBI requests for which a mask storage can be allocated within the masking structure 35.

Figure 5:
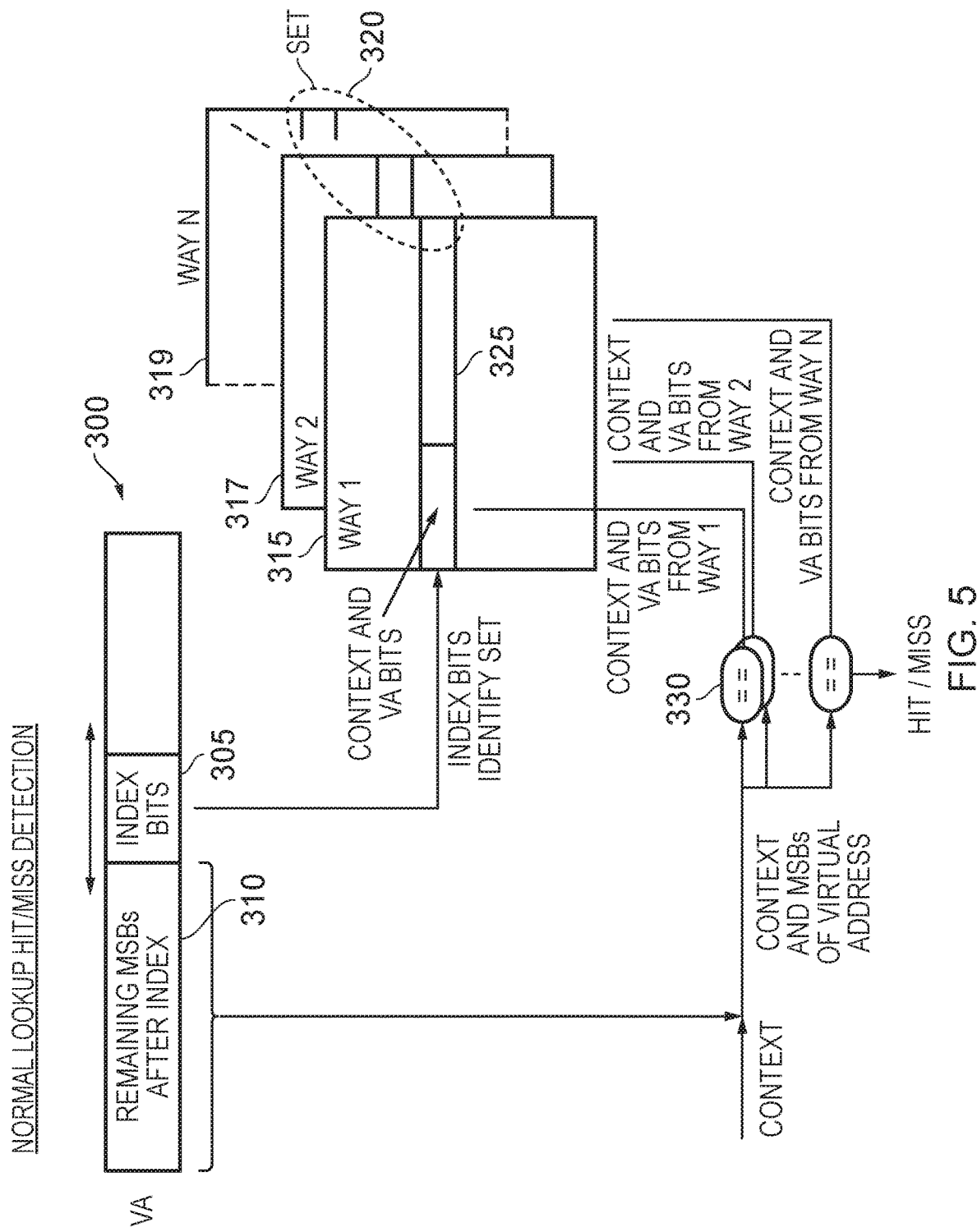
FIG. 5 is a diagram schematically illustrating how a virtual address is used to access entries within a set associative address translation cache in accordance with one example arrangement.

FIG. 5 is a diagram schematically illustrating how a virtual address is used to access entries within a set associative address translation cache in accordance with a normal lookup procedure, where a translation request has been received from the processor core (such a request may come directly from the core, or may be issued as a result of a miss occurring in a micro-TLB associated with the processor core). As shown, a certain number of index bits 305 within the virtual address 300 specified by the translation request will be identified based on a page size, and those bits will be used as an index into the various ways 315, 317, 319 of the set associative structure in order to identify a set 320 containing one entry in each way. The contents of those entries within the set may then be routed to comparison circuitry 330 where the remaining most significant bits 310 of the virtual address (i.e. the bits more significant than the index bits) will be compared with corresponding bits in the virtual address field of each entry 325 in order to detect whether a hit is present. Only entries marked as valid will be considered, and other criteria may also need to be met for a hit to be detected. For example, as shown in FIG. 5, the context information specified in association with the virtual address will also need to match the context information stored in an entry in order for a hit to be detected. If a hit is detected, the address translation data stored in the hit entry can be output as a response, whilst if a miss is detected a page table walk process will be initiated to obtain the address translation data from memory.

Figure 6A:
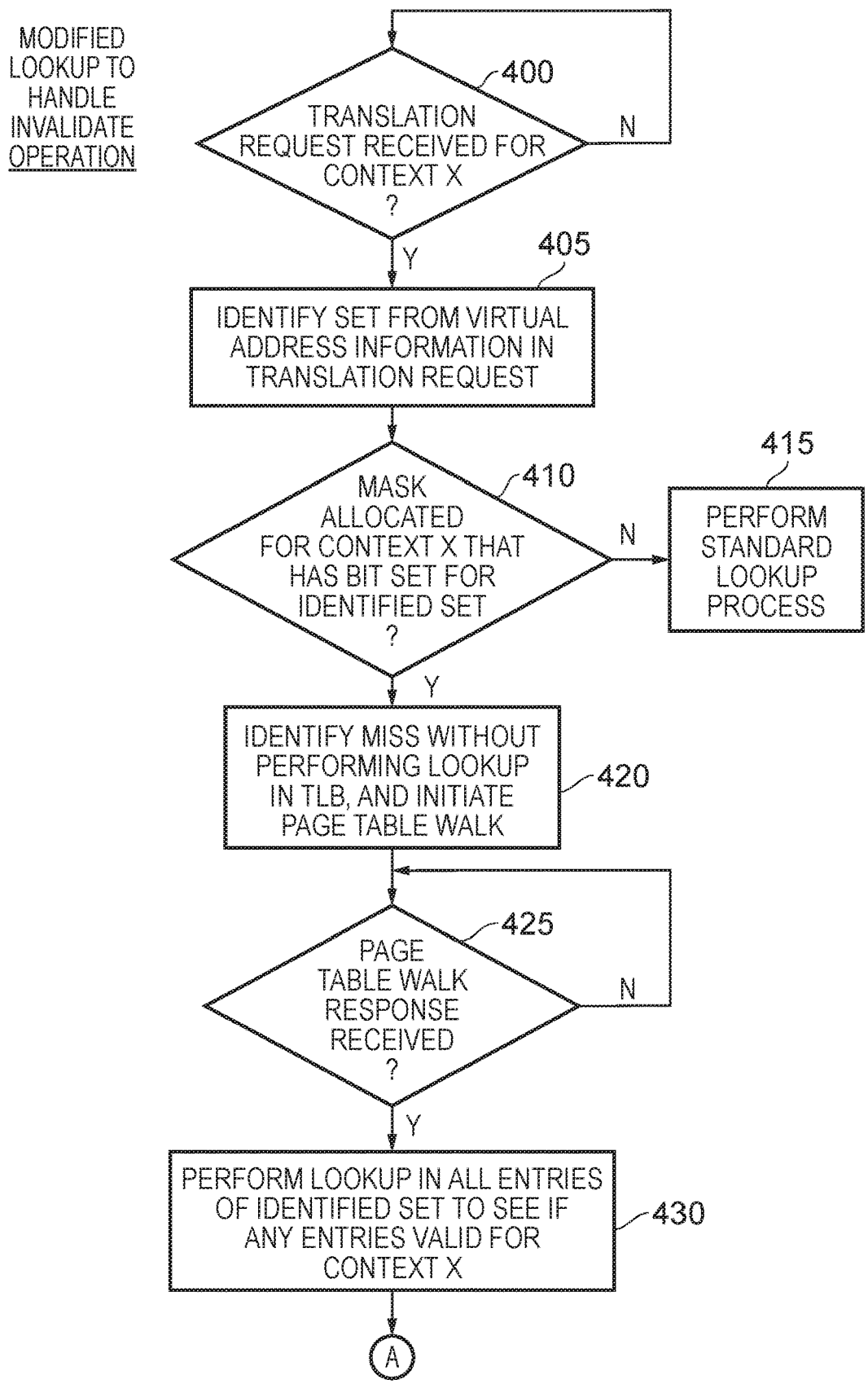
FIGS. 6A and 6B are a flow diagram illustrating a modified lookup procedure employed in one example arrangement, in order to handle an invalidate operation when the requirement for such an invalidate operation is indicated by the masking structure, in accordance with one example arrangement.
Figure 6B:
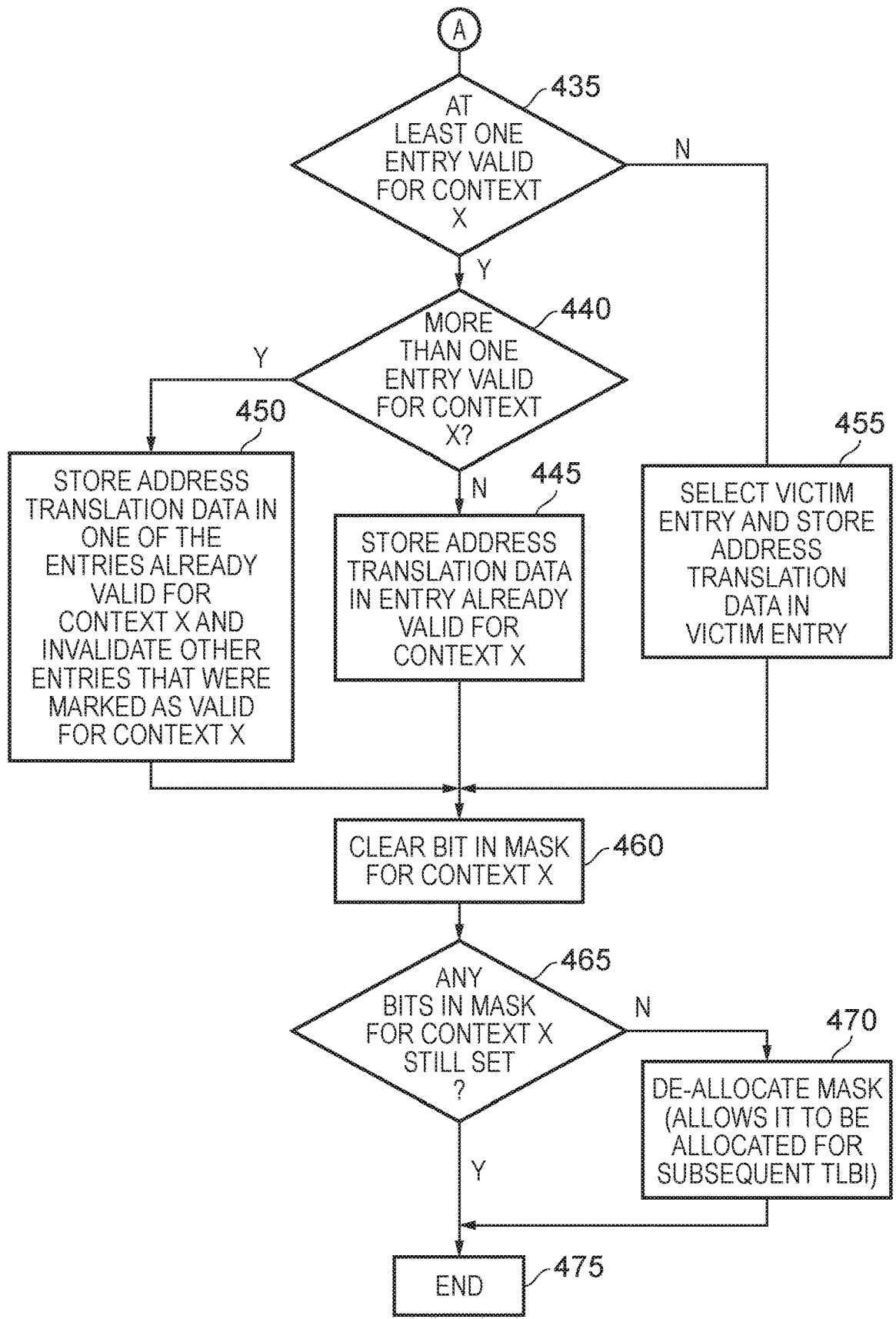

Whilst the above discussion with reference to FIG. 5 illustrates the default behaviour adopted in order to handle a translation request that identifies a virtual address and an associated context, in situations where that associated context is the same context as that associated with an active mask storage 140, 142 within the masking structure, and the set identified using the virtual address is a set for which the corresponding mask bit in the mask storage is set, then the above default behaviour is not adopted, and instead an alternative operation is performed, as will be discussed in more detail with reference to the flow diagram of FIGS. 6A and 6B.

At step 400, it is determined whether a translation request has been received. Each translation request will have an associated context, and in the example of FIGS. 6A and 6B it is assumed that that context is context X. Once the translation request has been received, the process proceeds to step 405 where a set within the set associative address translation cache 30 is identified using a certain number of bits of the virtual address. Then, at step 410 it is determined whether a mask storage 140, 142 is currently allocated within the masking structure 35 for context X, and in that case whether that allocated mask has a bit set for the identified set of the address translation cache. If not, then the process proceeds to step 415, where the standard lookup process discussed earlier with reference to FIG. 5 can be performed.

However, if at step 410 it is determined that a mask is allocated for context X that has the bit set for the identified set, then the process proceeds to step 420 where a miss is identified without performing a lookup within the address translation cache. Since the request is treated as resulting in a miss at this point, then this causes a page table walk to be initiated.

At step 425 the page table walk response is awaited, and once received the process proceeds to step 430 where a lookup is performed in all of the entries of the identified set to see if any of the entries are valid for context X (i.e. whether there is any entry whose context field 112 identifies context X, and whose valid field 120 is set to identify the entry as valid).

The process then proceeds to step 435 where it is determined whether at least one entry is valid for context X. If it is, then at step 440 it is determined whether there is more than one entry that is valid for context X, and if not the process proceeds to step 445. In particular, at this point it has been determined that there is one entry within the set that is valid for context X. Accordingly, at step 445, the address translation data that has been obtained by the page table walk process is stored in that entry that is already valid for context X, thereby overwriting (and effectively invalidating) the previously stored content.

If at step 440, there is more than one entry valid for context X, then the process proceeds to step 450 where one of those entries is chosen as the entry into which to store the address translation data obtained by the page table walk process. All of the other entries that were marked as valid for context X are then invalidated by clearing the valid bit 120. As a result, at this point the required invalidation operation has been performed in respect of all of the relevant entries within the identified set.

If at step 435 it is determined that there are in fact no entries that are valid for context X, then the process proceeds to step 455 where a victim entry is selected using a standard victim selection policy (such as least recently used), and then the address translation data is stored in the victim entry, with the valid bit 120 being set.

Irrespective of which of steps 445, 450 and 455 are performed, the process then proceeds to step 460, where within the mask storage 140, 142 that has been allocated for context X, the bit is cleared that is associated with the identified set, to thereby indicate that the invalidate operation has been performed in respect of any relevant entry within that set.

At step 465, it is then determined whether there are any bits within the mask for context X that are still set. If not, then this means that the original TLBI request has been fully actioned, and accordingly at step 470 the mask storage is deallocated, thereby allowing it to be allocated for a subsequent TLBI request. There are a number of ways in which the mask can be deallocated, for example by clearing the valid flag mentioned earlier, and/or by clearing the context information in the associated context storage so that it is apparent that the mask storage associated with that context storage is free for subsequent allocation.

Following step 470, or directly following step 465 if there are still some set bits within the mask storage for context X, the process then ends at step 475.

Figure 7:
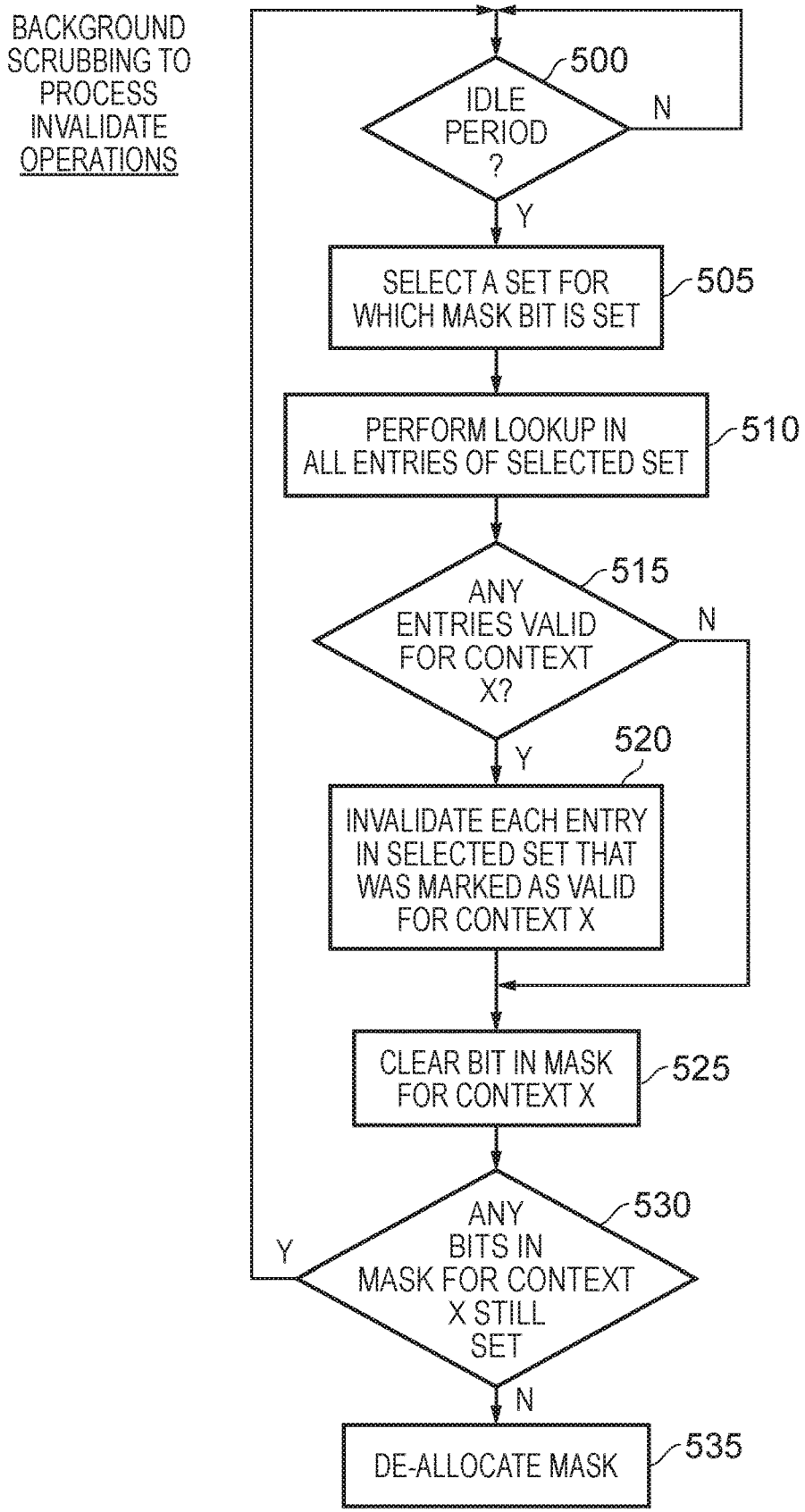
FIG. 7 is a flow diagram illustrating a background scrubbing mechanism that can be used to process invalidate operations indicated as being required by the contents of the masking structure, in accordance with one example arrangement.

As will be apparent from the above discussion, the TLBI request can be actioned on a set-by-set basis as translation requests are received that index into a set for which the invalidate operation has not yet been performed. In one implementation, this process alone can be used to implement the TLBI request, but in an alternative implementation that process can be supplemented by an additional background scrubbing process as illustrated by the flow diagram of FIG. 7. In particular, any idle periods, where the control circuitry is not being used to process active translation requests from the processor core or other maintenance requests, can be used to process invalidate requests for which the masking structure identifies there are still one or more invalidation operations to be performed.

Hence, at step 500 it is determined whether there is an idle period available, i.e. one or more unused cycles that the control circuitry can take advantage of to perform invalidation operations. If so, then at step 505 a set is selected for which a mask bit within the mask storage 140, 142 is still set. At step 510 a lookup operation is then performed in all of the entries of the associated set, and at step 515 it is determined whether any of those entries are valid for context X. If so, then at step 520 each entry in the selected set that was marked as valid for context X is invalidated, by clearing the valid bit information. Thereafter the process proceeds to step 525 where the relevant bit in the mask storage 140, 142 (i.e. the bit identifying the set selected at step 505) is cleared. If at step 515 it is determined that none of the entries are valid for context X, then the process can proceed directly to step 525.

Following step 525, it is determined whether there are still any bits in the mask storage for context X that are still set, and if so the process returns to step 500 to await another idle period. However, if at step 530 it is determined that there are no longer any bits set in the mask storage for context X, then at step 535 the mask storage can be deallocated, to free up that mask storage for use in association with a subsequently issued TLBI request targeting an entire context.

As mentioned earlier, the context information can take a variety of forms, for example being dependent on the process currently being executed by the processor core 10 and/or the exception level at which the processor core is currently operating. With regard to the context information being dependent on the process being performed, then that process can be identified in a variety of different ways. As mentioned earlier, in one particular implementation multiple virtual machines may be executed on the processor core, in which case the context information will be dependent on the virtual machine operating on the processor core. An example of such a system is shown in FIG. 8A.

Figure 8A:
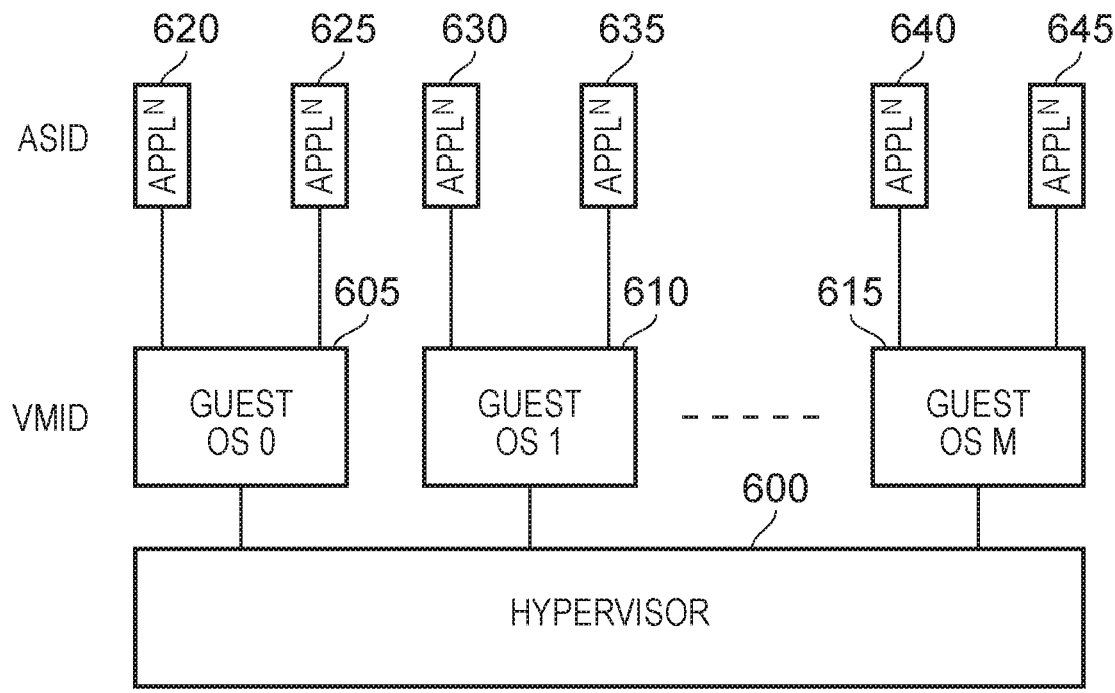
FIG. 8A schematically illustrates a virtual machine implementation.

As shown in FIG. 8A, the processor core 10 may be arranged to employ a hypervisor 600 to manage multiple virtual machines, each virtual machine consisting of a guest operating system 605, 610, 615 and associated applications 620, 625, 630, 635, 640, 645 executed by those guest operating systems. An identification scheme can be used to identify access requests issued by the various applications. In particular, a virtual machine identifier (VMID) can be associated with each guest operating system 605, 610, 615, and each application may have an associated address space identifier (ASID). When an access request is issued to the address translation circuitry 20 from the processor core 10, then a virtual address may be associated with that access request, and in addition both the VMID and ASID information may be provided to identify the application issuing the access request.

Figure 8B:
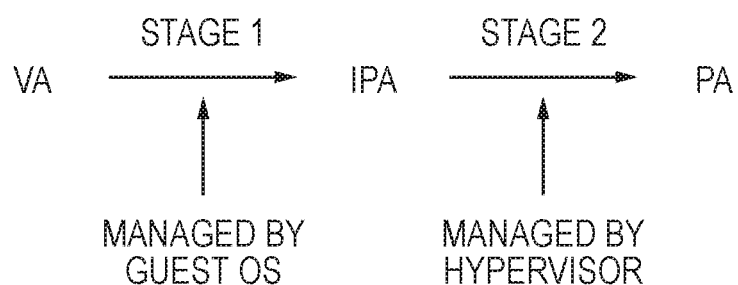
FIG. 8B illustrates a two-stage address translation process that may be used within a virtual machine implementation.

As shown in FIG. 8B, a two stage address translation process may be used in order to convert the virtual address specified by the access request into a physical address within the memory system 15. In particular, via a stage one translation process managed by the relevant guest operating system, a virtual address may be converted into an intermediate physical address, and then that intermediate physical address can be converted via a stage two translation process controlled by the hypervisor, in order to produce the final physical address. By such a two stage address translation process, a guest operating system is able to manage how the virtual addresses specified by particular applications are translated, but with the hypervisor still retaining some overall control in the process to ensure that the address spaces allocated within the memory system to the various virtual machines are kept separate.

Whilst at each stage of the address translation process, a single level of translation may be used, it is often the case that each stage of the address translation process includes multiple levels of translation.

In one example implementation, the address translation cache 30 may be arranged so that only full address translation data sufficient to convert a virtual address into a physical address is stored in each entry. However, as mentioned earlier with reference to FIG. 3, in one implementation different types of address translation data may be able to be stored within the entries of the address translation cache. In particular, in addition to full address translation data, partial address translation data may also be able to be stored. For example, one or more entries may be arranged to store partial address translation information relating to either the stage 1 address translation process or the stage 2 address translation process illustrated in FIG. 8B. For stage 2 translations the context may be identified by the VMID information, and the same technique as discussed earlier can then be applied for TLBI operations targeting stage 2 translations for a particular VMID.

As will be apparent from the above description, the techniques described herein allow an efficient processing of maintenance requests that target an entire context, allowing an early sync response to be issued to the request source, whilst ensuring that the processor core 10 is prevented from accessing out-of-date information within the address translation cache 20. The masking structure as described herein is used not only to prevent access to out-of-date information, but also is used as a mechanism to enable the required maintenance operations to be performed on a set-by-set basis after the sync response has been returned to the request source.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a set associative address translation cache having a plurality of entries organised as a plurality of sets of entries, each entry arranged to store address translation data used by processing circuitry when converting a virtual address into a corresponding physical address of a memory system, the processing circuitry being arranged to operate in a plurality of contexts and each entry having an associated context identifier to identify the context to which the address translation data stored therein applies;
control circuitry to control access to the address translation cache; and
a masking structure comprising at least one mask storage and, for each mask storage, an associated context storage, each mask storage providing a mask field for each set of the plurality of sets of entries of the plurality of sets of entries of the address translation cach wherein:
the control circuitry is arranged to receive a maintenance request issued by a request source and specifying a given context, where the maintenance request requires a maintenance operation to be performed in respect of each entry of the address translation cache that stores address translation data applying to the given context;
the control circuitry is responsive to the maintenance request to set each mask field in a selected mask storage, to store an indication of the given context in the associated context storage for the selected mask storage, and to issue a response to the request source that enables the request source to continue operating as though each maintenance operation required by the maintenance request has been performed; and
the control circuitry is arranged to use the masking structure to prevent access by the processing circuitry to address translation data that applies to the given context and that is stored in an entry for which the maintenance operation has yet to be performed.

2. An apparatus as claimed in claim 1, wherein:
the control circuitry is responsive to a translation request identifying a virtual address and an associated context, to perform, as a default operation, a lookup operation in the address translation cache to determine whether the address translation data required to convert the identified virtual address into a corresponding physical address is stored in one of the entries of a determined set of the plurality of sets of entries of the address translation cache, where the determined set is dependent on the identified virtual address; and
the control circuitry is arranged, when the associated context is the given context and the mask field for the determined set is set in the selected mask storage, to perform an alternative operation instead of the default operation, performance of the alternative operation causing the maintenance operation to be performed in respect of any entry of the determined set that stores address translation data applying to the given context.

3. An apparatus as claimed in claim 2, wherein performance of the alternative operation further causes a response to be output for the translation request that provides the address translation data that applies after the maintenance operation has been performed.

4. An apparatus as claimed in claim 2, wherein once the maintenance operation has been performed in respect of each entry of the determined set that stores address translation data applying to the given context, the masking structure is arranged to clear within the selected mask storage the mask field for the determined set.

5. An apparatus as claimed in claim 2, wherein during performance of the alternative operation the control circuitry is arranged to initiate a page table walk process in order to obtain from the memory system the address translation data required, for the given context, to convert the identified virtual address into the corresponding physical address, and to allocate that obtained address translation data into a chosen entry of the determined set whilst ensuring that the maintenance operation is performed in respect of any entry of the determined set that already stores address translation data applying to the given context.

6. An apparatus as claimed in claim 5, wherein, when at least one entry in the determined set already stores address translation data applying to the given context, the chosen entry is selected from said at least one entry.

7. An apparatus as claimed in claim 6, wherein when multiple entries in the determined set already store address translation data applying to the given context, then all of those multiple entries other than the chosen entry are invalidated in order to implement the maintenance operation.

8. An apparatus as claimed in claim 5, wherein when no entry in the determined set already stores address translation data applying to the given context, the control circuitry is arranged to implement a default selection policy in order to identify the chosen entry into which the obtained address translation data is to be allocated.

9. An apparatus as claimed in claim 1, wherein the control circuitry is arranged to perform the maintenance operation required by the maintenance request as a background activity, and once the maintenance operation has been performed in respect of each entry of a chosen set that stores address translation data applying to the given context, the masking structure is arranged to clear within the selected mask storage the mask field for the chosen set.

10. An apparatus as claimed in claim 1, wherein:
each mask field within the selected mask storage is cleared once the maintenance operation has been performed in respect of each entry of the associated set that stores address translation data applying to the given context; and
once all mask fields within the selected mask storage have been cleared, the masking structure is arranged to de-allocate the selected mask storage, to enable that mask storage to be available for selection in association with a subsequent maintenance request.

11. An apparatus as claimed in claim 1, wherein the control circuitry is responsive to the maintenance request, at least in the absence of a special condition, to choose an unallocated mask storage to be allocated as the selected mask storage for the given context.

12. An apparatus as claimed in claim 11, wherein the special condition is detected when a mask storage is already allocated for the given context, and the control circuitry is arranged to be responsive to the maintenance request, in the presence of the special condition, to choose the already allocated mask storage as the selected mask storage, and to set any mask field in that selected mask storage that is currently cleared.

13. An apparatus as claimed in claim 1, wherein the maintenance operation to be performed in respect of each entry of the address translation cache that stores address translation data applying to the given context is an invalidate operation, such that address translation data stored in the address translation cache for the given context at the time the maintenance request is processed by the control circuitry is to be invalidated.

14. An apparatus as claimed in claim 1, wherein the processing circuitry is arranged to execute multiple processes, and a current context is dependent on at least which process is currently being executed.

15. An apparatus as claimed in claim 14, wherein the processing circuitry is configured to operate at multiple different exception levels, and the current context is further dependent on which exception level the processing circuitry is operating at.

16. An apparatus as claimed in claim 14, wherein the processing circuitry is arranged to execute multiple items of supervised software under the control of a supervising element, each item of supervised software having associated applications, and a current context of the processing circuitry is dependent on the item of supervised software and the associated application currently being executed.

17. An apparatus as claimed in claim 16, wherein each item of supervised software comprises a guest operating system, and the supervising element is a hypervisor used to manage execution of the guest operating systems.

18. An apparatus as claimed in claim 1, wherein each mask storage is arranged to store a bit vector, and each mask field comprises a bit in the bit vector.

19. A method of handling maintenance operations, comprising:
providing a set associative address translation cache having a plurality of entries organised as a plurality of sets of entries, each entry storing address translation data used by processing circuitry when converting a virtual address into a corresponding physical address of a memory system, the processing circuitry being arranged to operate in a plurality of contexts and each entry having an associated context identifier to identify the context to which the address translation data stored therein applies;
providing a masking structure comprising at least one mask storage and, for each mask storage, an associated context storage, each mask storage providing a mask field for each set of the plurality of sets of entries of the address translation cache;
receiving a maintenance request issued by a request source and specifying a given context, where the maintenance request requires a maintenance operation to be performed in respect of each entry of the address translation cache that stores address translation data applying to the given context;
responsive to the maintenance request, setting each mask field in a selected mask storage, storing an indication of the given context in the associated context storage for the selected mask storage, and issuing a response to the request source that enables the request source to continue operating as though each maintenance operation required by the maintenance request has been performed; and
employing the masking structure to prevent access by the processing circuitry to address translation data that applies to the given context and that is stored in an entry for which the maintenance operation has yet to be performed.

20. An apparatus comprising:
set associative address translation cache means having a plurality of entries organised as a plurality of sets of entries, each entry for storing address translation data used by processing circuitry when converting a virtual address into a corresponding physical address of a memory system, the processing circuitry being arranged to operate in a plurality of contexts and each entry having an associated context identifier for identifying the context to which the address translation data stored therein applies;
control means for controlling access to the address translation cache means; and
masking means comprising at least one mask storage means and, for each mask storage means, an associated context storage means, each mask storage means for providing a mask field for each set of the plurality of sets of entries of the address translation cache means;
wherein:
the control means for receiving a maintenance request issued by a request source and specifying a given context, where the maintenance request requires a maintenance operation to be performed in respect of each entry of the address translation cache means that stores address translation data applying to the given context;

the control means, in response to the maintenance request, for setting each mask field in a selected mask storage means, for storing an indication of the given context in the associated context storage means for the selected mask storage means, and for issuing a response to the request source that enables the request source to continue operating as though each maintenance operation required by the maintenance request has been performed; and the control means for using the masking means to prevent access by the processing circuitry to address translation data that applies to the given context and that is stored in an entry for which the maintenance operation has yet to be performed.

* * * * *